(12) United States Patent
Hill

(10) Patent No.: US 6,457,686 B1
(45) Date of Patent: Oct. 1, 2002

(54) HANDHELD DRYER SUPPORT DEVICE

(76) Inventor: Barbara A. Hill, 7889 Cheverly La., Glen Burnie, MD (US) 21060

( * ) Notice: Subject to any disclaimer, the term of this patent is extended or adjusted under 35 U.S.C. 154(b) by 0 days.

(21) Appl. No.: 09/922,285

(22) Filed: Aug. 3, 2001

(51) Int. Cl.[7] .............................................. F16M 11/00
(52) U.S. Cl. ..................... 248/176.1; 248/205.5; 248/309.3; 248/122.1; 248/286.1; 248/125.1; 248/311.2
(58) Field of Search .................... 248/125.8, 176.1, 248/176.2, 188.5, 333, 124.1, 289.11, 286.1, 285.1, 283.1, 287, 314, 311.2, 309.3, 205.5, 125.9, 122.1, 161, 121, 125.1, 125.3, 415, 137, 911

(56) References Cited

U.S. PATENT DOCUMENTS

| | | | |
|---|---|---|---|
| 1,288,611 A | * 12/1918 | Jones | 248/176.1 |
| 1,364,118 A | * 1/1921 | Lamkin | 248/176.1 |
| 2,681,200 A | * 6/1954 | Bisson | 248/285.1 |
| 4,225,106 A | 9/1980 | Elpan | |
| 4,278,223 A | * 7/1981 | Fauteux | 248/125 |
| 4,453,695 A | 6/1984 | Sennott et al. | |
| 4,466,203 A | * 8/1984 | Thomas | 34/99 |
| 4,712,313 A | 12/1987 | Gettleman | |
| 5,064,154 A | 11/1991 | Payne | |
| 5,172,880 A | * 12/1992 | Mcdougall | 248/185 |
| D342,343 S | * 12/1993 | Slivko | D28/18 |
| 5,359,461 A | 10/1994 | Rice et al. | |
| 5,613,305 A | * 3/1997 | Narrin | 34/90 |
| 5,630,517 A | * 5/1997 | Maznik | 211/70.6 |
| 5,636,815 A | * 6/1997 | Wilson | 248/125.9 |
| 5,640,781 A | * 6/1997 | Carson | 34/97 |
| 5,761,825 A | 6/1998 | Ammon | |
| 5,845,664 A | * 12/1998 | Ryder et al. | 135/65 |
| 5,956,861 A | * 9/1999 | Barnes | 34/90 |
| 6,390,424 B1 | * 5/2002 | Kidushim et al. | 248/122.1 |

\* cited by examiner

Primary Examiner—Kimberly T. Wood

(57) ABSTRACT

A handheld dryer support device for supporting a handheld electric dryer at various angles without the user having to use one's hands. The handheld dryer support device includes a base member being adapted to be securely mounted to a structure; and also includes an arm assembly being pivotally mounted to the base member and including a plurality of elongate tubular members; and further includes a dryer support member being removably and securely attached to the arm assembly for supporting a handheld dryer.

5 Claims, 2 Drawing Sheets

HANDHELD DRYER SUPPORT DEVICE

BACKGROUND OF THE INVENTION

1. Field of the Invention

The present invention relates to dryer support devices and more particularly pertains to a new handheld dryer support device for supporting a handheld electric dryer at various angles without the user having to use one's hands.

2. Description of the Prior Art

The use of dryer support devices is known in the prior art. More specifically, dryer support devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,453,695; 4,225,106; 5,761,825; 5,064,154; 4,712,313; 5,359,461; and U.S. Pat. No. Des. 261,818.

While these devices fulfill their respective, particular objectives and requirements, the aforementioned patents do not disclose a new handheld dryer support device. The inventive device includes a base member being adapted to be securely mounted to a structure; and also includes an arm assembly being pivotally mounted to the base member and including a plurality of elongate tubular members; and further includes a dryer support member being removably and securely attached to the arm assembly for supporting a handheld dryer.

In these respects, the handheld dryer support device according to the present invention substantially departs from the conventional concepts and designs of the prior art, and in so doing provides an apparatus primarily developed for the purpose of supporting a handheld electric dryer at various angles without the user having to use one's hands.

SUMMARY OF THE INVENTION

In view of the foregoing disadvantages inherent in the known types of dryer support devices now present in the prior art, the present invention provides a new handheld dryer support device construction wherein the same can be utilized for supporting a handheld electric dryer at various angles without the user having to use one's hands.

The general purpose of the present invention, which will be described subsequently in greater detail, is to provide a new handheld dryer support device which has many of the advantages of the dryer support devices mentioned heretofore and many novel features that result in a new handheld dryer support device which is not anticipated, rendered obvious, suggested, or even implied by any of the prior art dryer support devices, either alone or in any combination thereof.

To attain this, the present invention generally comprises a base member being adapted to be securely mounted to a structure; and also includes an arm assembly being pivotally mounted to the base member and including a plurality of elongate tubular members; and further includes a dryer support member being removably and securely attached to the arm assembly for supporting a handheld dryer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new handheld dryer support device which has many of the advantages of the dryer support devices mentioned heretofore and many novel features that result in a new handheld dryer support device which is not anticipated, rendered obvious, suggested, or even implied by any of the prior art dryer support devices, either alone or in any combination thereof.

It is another object of the present invention to provide a new handheld dryer support device which may be easily and efficiently manufactured and marketed.

It is a further object of the present invention to provide a new handheld dryer support device which is of a durable and reliable construction.

An even further object of the present invention is to provide a new handheld dryer support device which is susceptible of a low cost of manufacture with regard to both materials and labor, and which accordingly is then susceptible of low prices of sale to the consuming public, thereby making such handheld dryer support device economically available to the buying public.

Still yet another object of the present invention is to provide a new handheld dryer support device which provides in the apparatuses and methods of the prior art some of the advantages thereof, while simultaneously overcoming some of the disadvantages normally associated therewith.

Still another object of the present invention is to provide a new handheld dryer support device for supporting a handheld electric dryer at various angles without the user having to use one's hands.

Yet another object of the present invention is to provide a new handheld dryer support device which includes a base member being adapted to be securely mounted to a structure; and also includes an arm assembly being pivotally mounted to the base member and including a plurality of elongate tubular members; and further includes a dryer support member being removably and securely attached to the arm assembly for supporting a handheld dryer.

Still yet another object of the present invention is to provide a new handheld dryer support device that is easy and convenient to use.

Even still another object of the present invention is to provide a new handheld dryer support device that allows the user to dry one's hair while having both hands to comb or brush one's hair, apply mousse, hairspray and other accessories.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
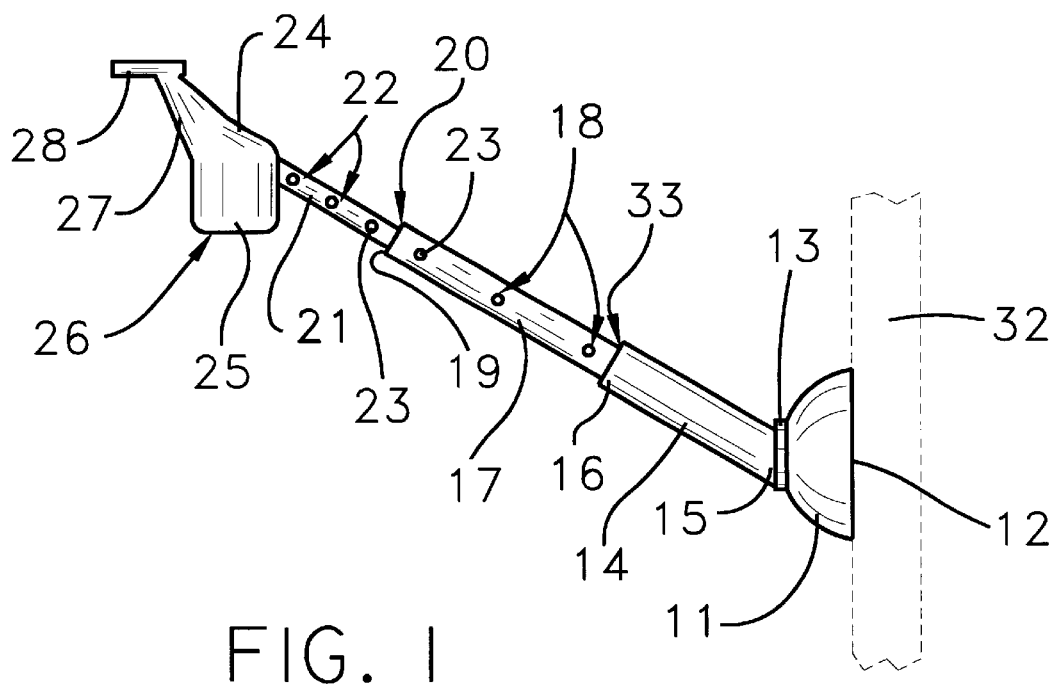
FIG. 1 is a side elevational view of a new handheld dryer support device according to the present invention.
Figure 2:
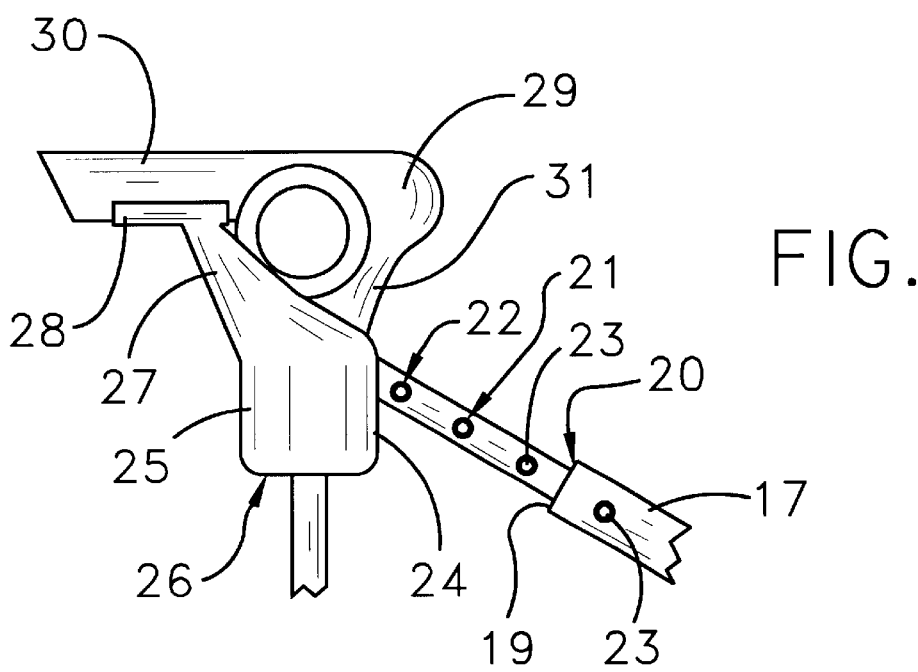
FIG. 2 is a partial side elevational view of the present invention shown in use.
Figure 3:
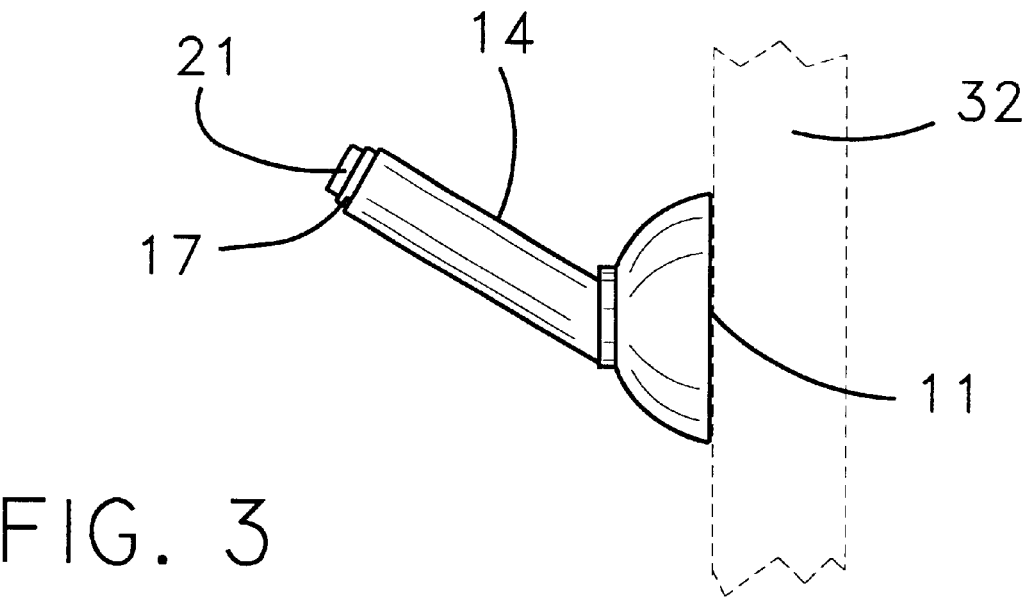
FIG. 3 is a side elevational view of the present invention in retracted position.
Figure 4:
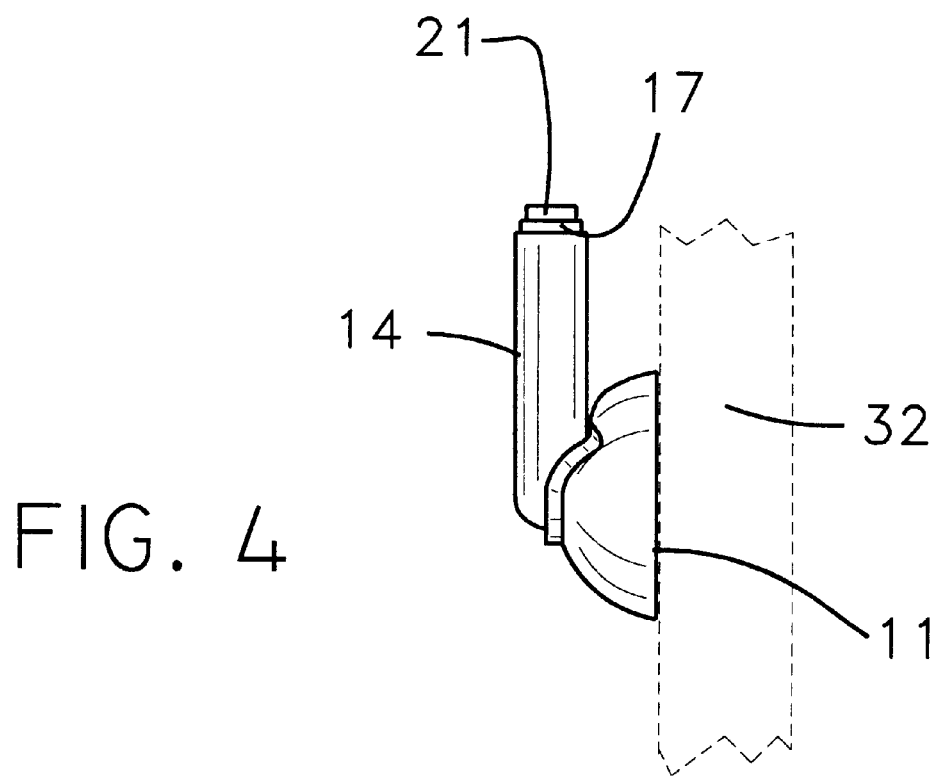
FIG. 4 is a side elevational view of the present invention in retracted and folded position.

With reference now to the drawings, and in particular to FIGS. 1 through 4 thereof, a new handheld dryer support device embodying the principles and concepts of the present invention and generally designated by the reference numeral 10 will be described.

As best illustrated in FIGS. 1 through 4, the handheld dryer support device 10 generally comprises a base member 11 being adapted to be securely and conventionally mounted to a structure 32. The base member 11 has a first side 12 which is adapted to face and mount to the structure 32 and also has a second side 13. An arm assembly is pivotally mounted to the base member 11 and includes a plurality of elongate tubular members 14,17,21. The elongate tubular members 14,17,21 include a base tubular member 14 having a first end 15 which is pivotally disposed in the second side 13 of the base member 11 and also has an open second end 16 and further has a bore 33 being disposed therein through the open second end 16, and also includes an intermediate tubular member 17 being extendably and retractably disposed in the base tubular member 14 and having a plurality of holes 18 being spaced along and disposed through a wall thereof and further having an open end 19 and a bore 20 being disposed therein through the open end 19 thereof, and further includes an end tubular member 21 being extendably and retractably disposed in the intermediate tubular member 17 and having a plurality of holes 22 being spaced along and disposed through a wall thereof. The arm assembly also includes spring-loaded fastening members 23 being movably and biasedly disposed through the holes 18,22 of the intermediate and end tubular members 17,21.

A dryer support member 24 is removably and securely attached to the arm assembly for supporting a handheld dryer 31. The dryer support member 24 includes a cylindrically-shaped support portion 25 having a bore 26 extending therethrough and being removably and securely attached to an end of the end tubular member 21 and being adapted to receive a handle portion 31 of the handheld dryer 29 therein, and also includes an arm portion 27 being integrally attached to a top edge of the cylindrically-shaped support portion 25 and extending outwardly at an angle relative to the longitudinal axis of the cylindrically-shaped support portion 25, and further includes a platform portion 28 being integrally attached to a top end of the arm portion 27 and being adapted to support a barrel portion 30 of the handheld dryer 29.

In use, the user pivots the elongate tubular members 14,17,21 to the desired position, and places the handheld dryer 29 upon the dryer support member 24 so that the user has one's hands free to do other things including combing and brushing one's hair and applying hair products to one's hair without having to also hang onto the handheld dryer 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handheld dryer support device comprising:
a base member being mountable to a substantially planer support surface, said base member having a first side and a second side, said first side of said base member comprising a suction cup for releasably attaching to the support surface;
an arm assembly being pivotally mounted to said base member such that said arm assembly is pivotable in a plane oriented substantially perpendicular to a plane of the support surface, said arm assembly comprising a plurality of telescopic elongate tubular members; and
a dryer support member being removably and securely attached to said arm assembly for supporting a handheld dryer.

2. A handheld dryer support device as described in claim 1, wherein said plurality of elongate tubular members includes a base tubular member having a first end which is pivotally disposed in said second side of said base member and also having an open second end and further having a bore disposed therein through said open second end, and also includes an intermediate tubular member being extendably and retractably disposed in said base tubular member and having a plurality of holes being spaced along and disposed through a wall thereof and further having an open end and a bore being disposed therein through said open end thereof, and further includes an end tubular member being extendably and retractably disposed in said intermediate tubular member and having a plurality of holes being spaced along and disposed through a wall thereof.

3. A handheld dryer support device as described in claim 2, wherein said arm assembly also includes spring-loaded fastening members being movably and biasedly disposed through said holes of said intermediate and end tubular members.

4. A handheld dryer support device as described in claim 2, wherein said dryer support member includes a cylindrically-shaped support portion having a bore extending therethrough and being removably and securely attached to an end of said end tubular member and being adapted to receive a handle portion of the handheld dryer therein, and also includes an arm portion being integrally attached to a top edge of said cylindrically-shaped support portion and extending outwardly at an angle relative to a longitudinal axis of said cylindrically-shaped support portion, and further includes a platform portion being integrally attached to a top end of said arm portion and being adapted to support a barrel portion of the handheld dryer.

5. A handheld dryer support device comprising:

a base member being adapted to be securely mounted to a support surface, said base member having a first side and a second side, said first side of said base member comprising a suction cup such that said base member is releasably attachable to the support surface;

an arm assembly being pivotally mounted to said base member such that said arm assembly has two axis of motion, said arm assembly comprising a plurality of elongate tubular members, said plurality of elongate tubular members including a base tubular member having a first end which is pivotally disposed in said second side of said base member and also having an open second end and further having a bore being disposed therein through said open second end, and also including an intermediate tubular member being extendably and retractably disposed in said base tubular member and having a plurality of holes being spaced along and disposed through a wall thereof and further having an open end and a bore being disposed therein through said open end thereof, and further including an end tubular member being extendably and retractably disposed in said intermediate tubular member and having a plurality of holes being spaced along and disposed through a wall thereof, said arm assembly also including spring-loaded fastening members being movably and biasedly disposed through said holes of said intermediate and end tubular members; and a dryer support member being removably and securely attached to said arm assembly for supporting a handheld dryer, said dryer support member including a cylindrically-shaped support portion having a bore extending therethrough and being removably and securely attached to an end of said end tubular member and being adapted to receive a handle portion of the handheld dryer therein, and also including an arm portion being integrally attached to a top edge of said cylindrically-shaped support portion and extending outwardly at an angle relative to a longitudinal axis of said cylindrically-shaped support portion, and further including a platform portion being integrally attached to a top end of said arm portion and being adapted to support a barrel portion of the handheld dryer.

* * * * *